Jan. 19, 1960    G. SMITH ET AL    2,922,146
MEASURING SYSTEM WITH TEMPERATURE COMPENSATION
Filed Nov. 25, 1957    3 Sheets-Sheet 2
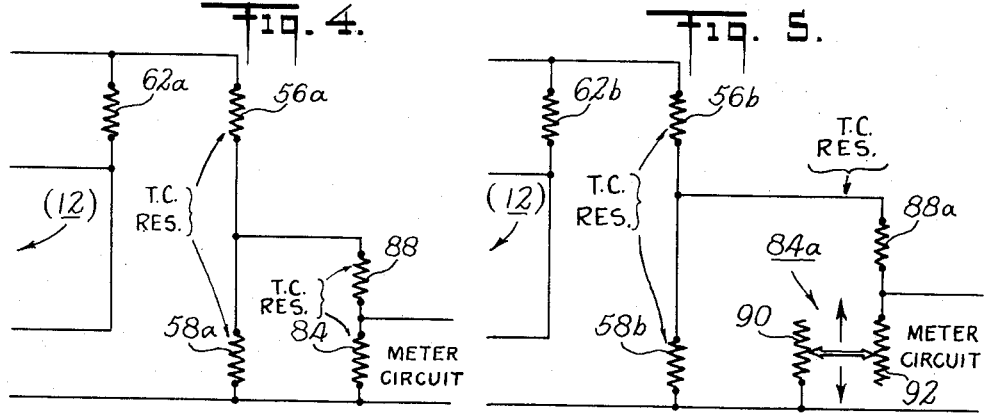
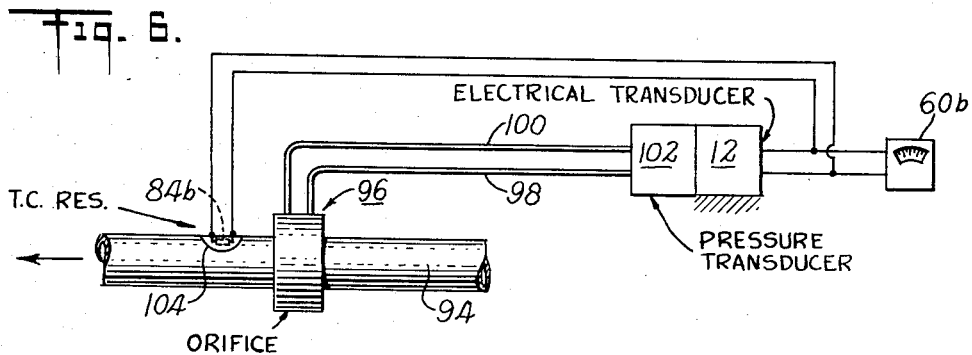
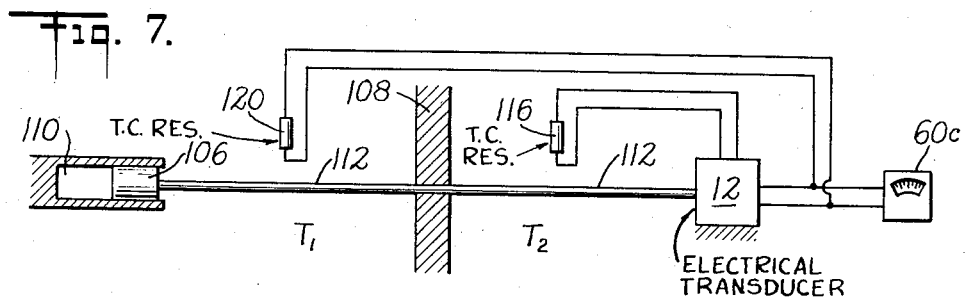
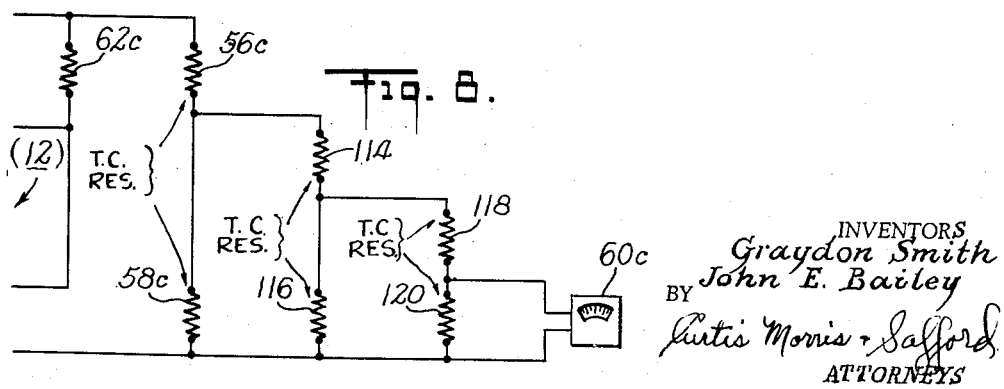
INVENTORS
Graydon Smith
BY John E. Bailey
Curtis Morris & Safford
ATTORNEYS Jan. 19, 1960  G. SMITH ET AL  2,922,146
MEASURING SYSTEM WITH TEMPERATURE COMPENSATION
Filed Nov. 25, 1957  3 Sheets-Sheet 3

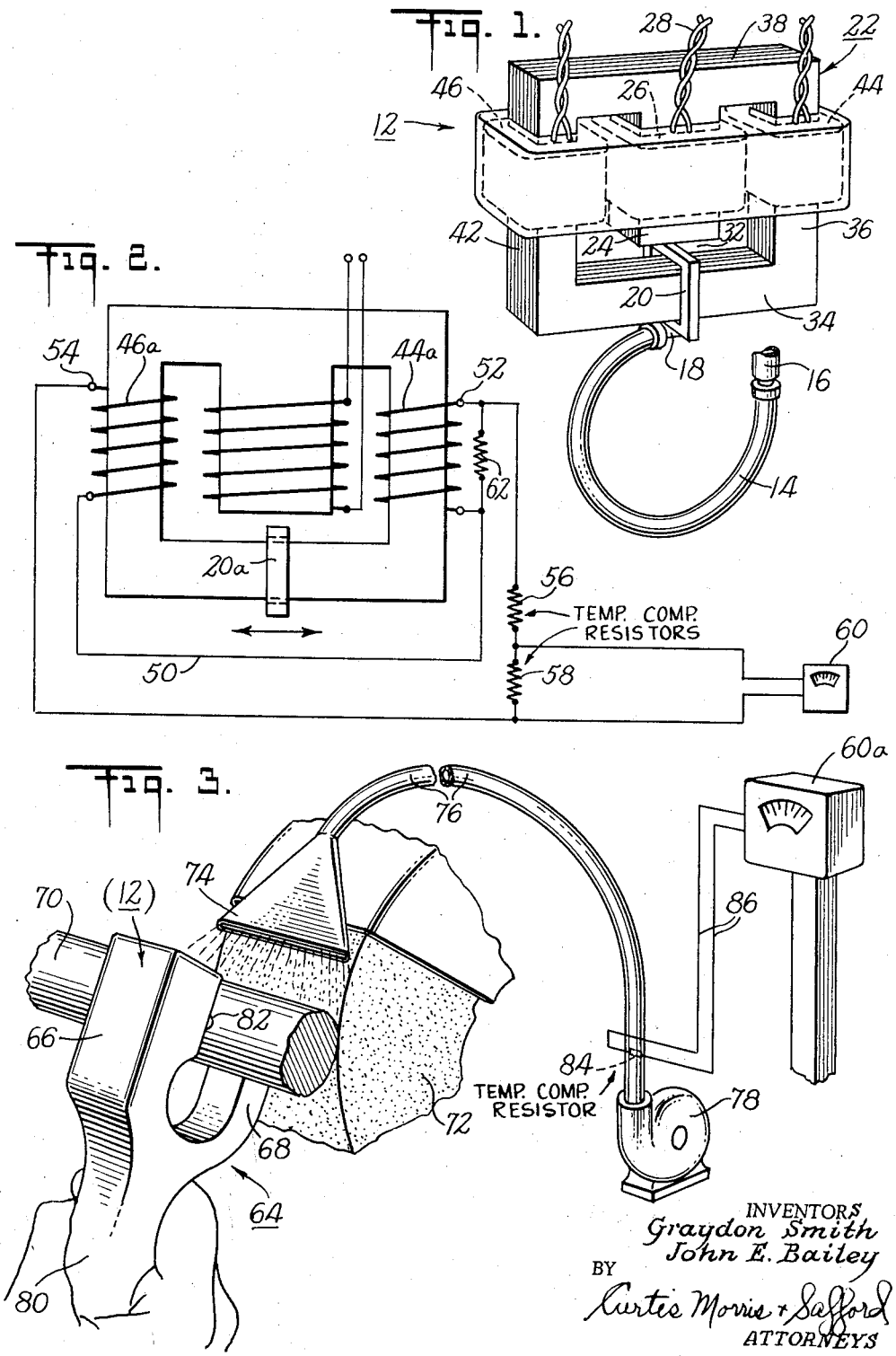

INVENTORS
Graydon Smith
John E. Bailey
BY
Curtis, Morris & Safford
ATTORNEYS

United States Patent Office 2,922,146
Patented Jan. 19, 1960

2,922,146

MEASURING SYSTEM WITH TEMPERATURE COMPENSATION

Graydon Smith, Concord, and John E. Bailey, Needham, Mass., assignors to Graydon Smith Products Corporation, West Concord, Mass.

Application November 25, 1957, Serial No. 698,655

7 Claims. (Cl. 340—199)

This invention is in the field of electrical measuring systems and relates particularly to position-responsive devices for producing an electrical signal the value of which is a measure of the displacement of a movable element from a predetermined position. This application is a continuation-in-part based on copending application Serial No. 319,064, now abandoned, filed on November 6, 1952, by the present applicants.

In many instances, the value of an unknown condition can be measured by arranging for the condition to control the physical displacement of a movable element and measuring the extent of the displacement. For example, it is often convenient to measure pressure, strain, roughness, etc., by measuring the amount of movement or the position of such a controlled element. In gauging, a feeler is commonly used and its displacement from a predetermined position is a direct measure of the deviation of the test piece from a predetermined dimension.

Because electrical signals can be magnified electronically, it is advantageous in many instances to translate the position or displacement of the movable element into an electrical signal which, after amplification, can be used to operate an indicator, recorder, control system, or the like.

One particular translating device that has a number of important advantages is shown in U.S. Patent 2,207,248. This type of device, which is well adapted to make highly precise measurements, comprises a pair of magnetic circuits having a common air-gap. A movable "flux-barrier" is mounted within this air-gap to control the relative magnitudes of flux produced in the two magnetic circuits by an A.-C. energized primary winding. Secondary windings are provided on the two magnetic circuits respectively and are connected in series-opposition so that, when the flux-barrier is positioned to evenly divide the flux between the two circuits, the output voltage will be zero.

As the flux-barrier moves away from this "null" position, the output of one secondary winding will increase while the output of the other secondary winding will decrease. Consequently, there will be produced a net output voltage having a magnitude substantially linearly proportional to the extent of flux-barrier movement and having a phase determined by the direction of this motion away from the "null" position.

In applications where the condition of a measurement subject is determined by using such a device to measure the physical displacement of a primary sensing element (such as a pressure-responsive element) controlled by the condition, errors of substantial size can occur where the measurement subject or the primary element are subject to varying temperatures; that is, the change in physical characteristics of the subject or dimensions of the primary element can markedly alter the measurement signal produced even though there has been no change in the condition. For example, where the dimensions of an article are to be measured, as by a feeler gauge arrangement, any change in temperature of the article or the gauge will make a corresponding change in the dimension measurement.

Accordingly, it is an object of this invention to provide a system including an inductive position measuring device of the type described having means to avoid measurement errors due to changes in temperature of the subject being measured. It is a further object of this invention to provide such a system with means to avoid errors due to changes in the temperature of the primary measuring element and associated devices. It is a still further object of this invention to provide such a system that is simple in construction and economical to manufacture. Other objects, aspects and advantages of the invention will in part be pointed out in, and in part apparent from, the following description considered together with the accompanying drawings, in which:

Figure 1 is a perspective view of a position-responsive device adapted for measuring the deflection of a Bourdon tube;

Figure 2 shows diagrammatically a position-responsive device similar to that shown in Figure 1, and including temperature compensation means for the device itself;

Figure 3 shows the device of Figure 2 arranged in the form of a feeler gauge for measuring the thickness of a rod, and including means to avoid errors in measurement due to changes in the temperatures of the rod;

Figure 4 is a schematic diagram of the output circuit of the position-responsive device shown in Figure 3;

Figure 5 is a schematic diagram similar to Figure 4 but modified to include adjustable means to set the correction for rods of different material;

Figure 6 shows diagrammatically a flow measuring system including means to avoid errors due to temperature changes of the flowing liquid;

Figure 7 shows diagrammatically a measuring system for determining the position of an element located behind a radiation barrier;

Figure 8 is a schematic diagram of the output circuit of the position-responsive device shown in Figure 7.

Figure 9:
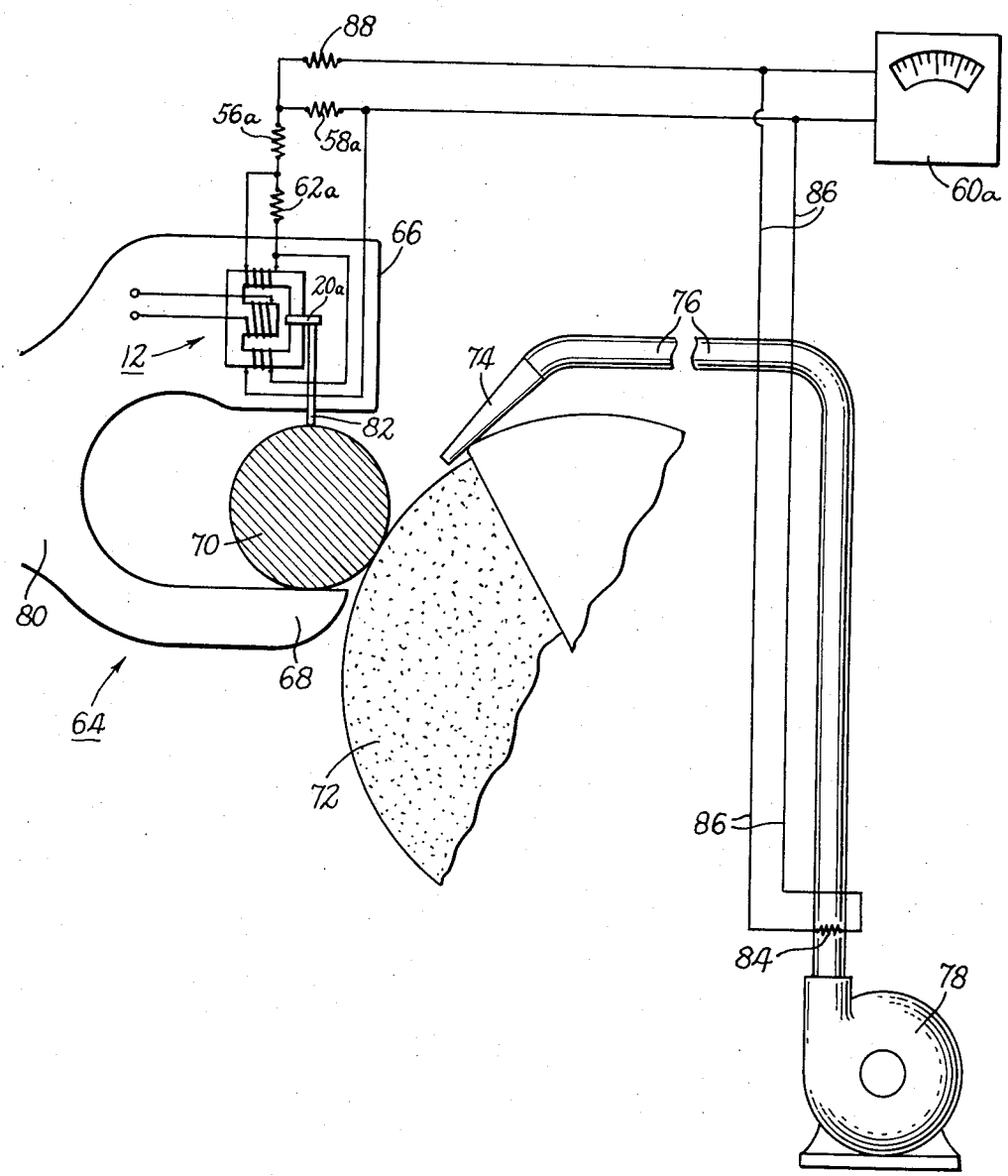
Figure 9 is a side view of the device shown in Figure 3, and includes details of the electrical circuitry as shown in Figures 2 and 4.

As shown in Figure 1, a position-responsive device, generally indicated at 12, is arranged to measure pressure by means of a Bourdon tube 14. When the internal pressure of the Bourdon tube is varied, as by changing the pressure applied to it through a fitting 16, the free end 18 of the tube is caused to move in accordance with the pressure variations, as is well known in the art. Attached to the free end 18 of the Bourdon tube 14 is a conductive ring or "flux-barrier" 20, which moves with the end 18 and controls the distribution of magnetic flux within the position-responsive device 12 so as to cause changes in the electrical output from the device, as explained hereinafter.

The position-responsive device 12 includes a three-legged magnetic core 22 formed of ferromagnetic material, such as laminated transformer iron. Surrounding the center leg 24 of the core 22 is a primary winding 26 connected by leads 28 to a source of alternating voltage, not shown. The alternating flux induced in the center leg 24 by the current flowing in the primary winding 26 can flow in either or both of two paths. One path extends from the leg 24 across an air gap 32 into the base portion 34 of the core and thence through the right-hand leg 36 and through the top portion 38 of the core back to the center leg 24. The other path extends from the center leg 24 across the air gap 32 through the base portion 34, through the left-hand leg 42, and through the top core portion 38 to the center leg 24. The common portions of these two paths include the center leg 24 and the air gap 32.

In order to measure the magnetic flux condition within the right-hand leg 36 a secondary winding 44 is placed therearound, and a voltage is induced in it by the flux in the right-hand leg 36. Surrounding the left-hand leg 42 is another identical secondary winding 46 in which a voltage is induced corresponding to the flux flowing through the leg 42. The relative distribution of the flux between the right and left-hand legs 36 and 42 can be determined by the voltages appearing across the outputs of the secondary windings 44 and 46, respectively.

The "flux-barrier" 20, which moves within the air gap 32, is a non-magnetic electrically conducting member which resists any change in the magnetic flux linking it or passing through it. In this example, the flux-barrier 20 comprises a single shorted turn of conductive non-magnetic material, such as copper, aluminum, or the like, and encloses, and is spaced from, the base portion 34 of the core 22. Because this shorted turn tends to prevent any change in the flux linkages through it, it acts to prevent the flow of any appreciable amount of alternating flux through the base 34 at the position of the flux-barrier. Accordingly, movement of the flux-barrier 20 to the right or left along the base portion 34 is utilized to control the relative division of flux between the right and left-hand legs 36 and 42 respectively.

If the flux-barrier 20 is positioned at the horizontal center of the air gap 32, that is, midway between the right-hand and left-hand edges of the gap as shown in Figure 1, the flux produced by the primary winding 26 will be divided equally between the right and left-hand legs 36 and 42, respectively.

If the flux-barrier 20 is displaced laterally in either direction from this center or zero position, the relative division of flux in the two legs 36 and 42 will be changed. For example, assume that the pressure in the Bourbon tube 14 changes so as to cause the flux-barrier 20 to move along the base 34 toward the right-hand leg 36, so as to reduce the area of the air gap 32 on the right of the flux-barrier 20 and to increase the area of the air gap on the left of the flux-barrier 20. The flux will pass into the base 34, but will be prevented from extending toward the right through the base 34 because of the presence of the flux-barrier 20, and so these flux lines will extend through the left-hand leg 42. Those flux lines extending across the air gap to the right of the flux-barrier 20 will be confined to the right-hand leg 36. With the flux-barrier 20 in this position, a greater portion of the flux induced in the core 22 by the primary winding 26 will flow through the left-hand leg 42, and accordingly, the voltage output from the secondary winding 46 will be relatively increased while that from the secondary winding 44 will be relatively decreased. These output voltages from the secondary windings 44 and 46 are measured in order to determine the position of the barrier 20 and hence the pressure in the tube 14.

Figure 2 shows diagrammatically the device of Figure 1 with the secondary windings 44a and 46a connected in series-opposition by a lead 50. For various reasons, the voltage developed across the secondary winding output terminals 52 and 54 decreases wtih an increase in ambient temperature, and to compensate for this effect these output terminals are connected to the ends of an amplitude-compensating network consisting of a resistor 56 in series with a resistor 58. The first of these resistors is formed of material having a zero temperature coefficient of resistance, while the other is formed of material having a positive temperature coefficient of resistance of such magnitude that the amplitude of the signal across the resistor 58 is maintained constant with changes in ambient temperature. As the temperature increases, for example, the resistance of resistor 58 increases relative to that of resistor 56, and hence a greater portion of the voltage appearing between terminals 52 and 54 is developed across resistor 58, so as to compensate for the decrease in voltage from the secondary windings.

The output signal produced across the resistor 58 is fed to a voltmeter 60 which may, if desired, include an amplifier and a phase-sensed amplitude detector of conventional type to produce a D.-C. signal having a magnitude and polarity corresponding to the amplitude and phase respectively of the A.-C. output signal fed thereto. The meter 60 indicates the amplitude of the output signal, which in turn is determined by the position of the flux-barrier 20a. A shunt resistor 62 is connected across one of the secondaries 44a to assure phase alignment between the individual secondary signals, so as to produce a sharp "null" when the flux-barrier is at its center position.

One very important problem in utilizing inductive devices of the type referred to above to obtain a precise measure of the position or dimensions of a primary element results from the fact that the measured position or dimension frequently is itself subject to variations with changes in temperature of the measurment subject or the primary element and associated parts. Such variations often are substantial, e.g. a change of 100° F. may result in a variation of 0.5% and more. Such a variation is considerably greater than the inherent measurement accuracy of the inductive device and consequently, to make full utilization of this inherent accuracy, means should be provided to avoid such errors.

Figure 3 shows a measuring system provided with means for avoiding errors which result from variations in the temperature of the element being measured. In this arrangement, there is provided a hand-held feeler gauge, generally indicated at 64, which includes a pair of forked arms 66 and 68 adapted to extend around a metal rod 70 to measure the diameter thereof. This rod is mounted on a conventional grinding machine (the details of which are not shown) and is arranged to rotate and engage a rotary grinding wheel 72; the rod and the wheel also are mounted for relative movement in the direction of the rod axis. A nozzle 74 is mounted adjacent the grinding wheel to direct a stream of coolant fluid on the portion of the rod in contact with the wheel. The coolant is fed to the nozzle through a pipe 76 the remote end of which is connected to a pump 78; conventional sump and return piping are not shown in order to simplify the drawing.

Within the gauge arm 66 is mounted an inductive device of the type designated with the reference number 12 in Figures 1 and 2, and this device is supplied with A.-C. power for example through the handle 80 of the gauge. Extending inwardly from the gauge arm 66 towards the other arm 68 is a feeler 82 which consists of a spring-loaded shaft having a rounded end tip adapted to be pressed against the surface of the rod 70. The opposite side of the rod contacts the lower gauge arm 68. The gauge structure, e.g. arms 66, 68 and feeler 82 are formed of material having a zero temperature coefficient of expansion so that ambient temperature changes do not affect the gauge measurements.

The feeler 82 is connected, within the upper gauge arm 66, to the flux-barrier of the inductive device (12) contained therein, so that as the feeler moves it correspondingly shifts this flux-barrier within its air-gap to vary the output voltage in the manner described hereinabove. This output voltage is fed (as by leads, not shown, extending out through the handle 80) to a meter 60a mounted to the rear of the grinding wheel 72, so that the diameter of the rod 70 can be read directly from this meter which is of course suitably calibrated for this purpose.

As is well known, the diameter of the rod 70 varies with its temperature, and it therefore is important that the gauging system be arranged to take this variation into account. This is accomplished by a resistor 84 which is mounted in the pipe 76 carrying the coolant for the grinding wheel. This resistor is connected by a pair of leads 86 in shunt across the circuit to the meter 60a, and (referring now to Figure 4) is connected in series with a second resistor 88. Resistor 84 is formed of material having a negative temperature coefficient of resistance, while resistor 88 in series therewith is formed of material having a zero temperature coefficient of resistance. The remote ends of resistors 84 and 88 are connected respectively to the terminals of a resistor 58a across which the output voltage of the device (12) appears. Resistor 58a is connected in series with another resistor 56a; both of these latter resistors are mounted in the arm 66 adjacent the inductive device (12) and are identical to resistors 56 and 58 shown in Figure 2.

The temperature of the rod 70 is, as a practical matter, equal to the temperature of the fluid dispensed from the nozzle 74. When the temperature of this fluid increases, the diameter of the rod of course increases correspondingly, and the feeler 82 is moved inwardly towards the gauge arm 66 so as to increase the output signal produced by the inductive device (12) within this arm. However, the increase in fluid temperature also lowers the resistance of the resistor 84, due to its negative temperature coefficient characteristic, and consequently the portion of this output signal fed to the meter 60a is reduced. By properly correlating the temperature coefficient of resistance of resistor 84 to the coefficient of thermal expansion of the rod 70, the signal fed to the meter 60a will remain constant regardless of the temperature of the grinding coolant and the rod. Furthermore, it may particularly be noted that the relatively low output impedance of the inductive device 12 (normally about 50 ohms or so) especially adapts such a device for use with resistive networks of the type described.

In some machining operations, of course, the temperature of the piece being measured by a feeler gauge will not be controlled as by coolant liquid, and in such cases the temperature of the piece often will vary with the ambient temperature of the room. In such situations, the practice has been to construct the feeler gauge measurement parts (e.g. the feeler 82 and the arms 66, 68) out of the same material that is used in the pieces being measured, and to keep the feeler gauge near the work piece so that their temperatures will be equal. With such an arrangement, any change in dimension of the work piece due to a variation in ambient temperature will be compensated for by a corresponding change in the measurement parts of the gauge, so that the reading will remain substantially unaffected by variations in ambient temperature.

However, the work pieces being measured often are made of a variety of different materials so that the temperature compensation provided by a single gauge is only approximate at best. This problem is solved by the arrangement shown in Figure 5, which is a schematic diagram of a modified output circuit for the inductive device (12) in the feeler gauge arm 66 (Figure 3). This modified circuit is identical to the previous arrangement in that it includes a balancing resistor 62b, a pair of compensating resistors 56b and 58b, and a resistor 88a having a zero temperature coefficient of resistance. In series with the latter resistor 88a, however, is a resistance combination 84a consisting of two potentiometers 90 and 92 with their movable arms connected together both electrically and physically.

These potentiometers 90 and 92 are so arranged that any adjustment of their movable arms does not alter the total resistance of the combination 84a, e.g. the change in active resistance of one potentiometer is equal and opposite to the change in active resistance of the other potentiometer. Potentiometer 90 is formed of material having a negative temperature coefficient of resistance (similar to resistor 84 in Figures 3 and 4) while potentiometer 92 is formed of material having a zero temperature coefficient of resistance. Consequently, the resistance combination 84a will always have a net negative temperature coefficient so that, by mounting it adjacent the work piece to be measured in such a manner that their temperatures will be equal, this resistance 84a will tend to compensate for changes in the dimension of the work piece due to temperature variations. The compensation can be made precise by adjusting the movable arms of the potentiometers so as to match the thermal expansion characteristics of the material of the work piece. In a practical form of construction, the movable arms of the potentiometers are operated by a knob which can be adjusted to any one of several scale-marked settings, e.g. one setting for steel work pieces, one for brass, one for aluminum, etc.

Figure 6 shows an arrangement where an inductive device 12 (represented by a block diagram here, but identical to the device shown in Figures 1 and 2) is used to measure the flow of gasoline through a pipe 94. To obtain this measurement, the pipe is provided with a conventional orifice-plate, generally indicated at 96, which as is well known produces a pressure differential in accordance with the rate of fluid flow. The upstream and downstream pressures are conducted by conduits 98 and 100 to a pressure transducer, indicated by the block diagram 102, which is arranged to position an output element (not shown) in accordance with the differential pressure across the orifice plate. The transducer may be a conventional opposed-bellows device such as shown in Jones Patent No. 2,400,048, and its movable output element is connected directly to the flux-barrier of the device 12 so as to position this flux-barrier within its air-gap in accordance with the measured differential pressure.

Due to the thermal expansion characteristics of gasoline, the volume of gasoline flowing through the orifice plate 96 may vary with a change in gasoline temperature, even though the actual amount of gasoline delivered to the pipe 94, as by a remote pumping station, remains constant. To avoid an error in measurement from this cause, the inductive device is provided with an output circuit like that shown in Figure 4. In the Figure 6 arrangement, however, a temperature-sensitive resistor 84b (corresponding to resistor 84 in Figure 4) is positioned in a well 104 (shown in exaggerated size for clarity) which extends into the stream of gasoline flowing through the pipe 94. This resistor 84b is, as before, shunted across the leads connecting the device 12 to a meter 60b, and is connected in series with a zero temperature coefficient resistor (reference 88 in Figure 4). The resistor 84b is maintained at the temperature of the flowing gasoline, and its temperature coefficient of resistance operates to produce a change in the output voltage such as to counteract the effects of a change in differential pressure due to variations in gasoline temperature.

Figures 7 and 8 show an arrangement for measuring the position of an element 106 which is located in a radioactive region behind a shield wall 108. As is well known, it is important to minimize the amount of apparatus that is in the radioactive zone. Furthermore, the radioactive zone frequently will be at a different temperature ($T_1$) than the zone ($T_2$) outside the shield wall, and these two temperatures often will fluctuate independently of one another. Consequently, there is a serious problem in making accurate positional and other measurements inside a radioactive zone by sensing apparatus which must be located outside of that zone.

In Figure 7, the element 106 is moved horizontally (i.e. left or right) within an elongated opening 110 by means of a rigid coupling rod 112 (which may, for example, form a control rod for varying the rate of fission). This rod, which is driven from outside the radioactive zone by conventional means (not shown), is connected at its remote end to the flux-barrier of an inductive device 12 so as to permit a determination of the positioning of the element 106 by reading the meter 60c. Since the temperature of the inductive device 12 is subject to variation, the output circuit of this device (referring now to Figure 8)

is provided with a pair of resistors 56c and 58c identical to resistors 56 and 58 in Figure 3.

In addition, however, the length of the rod 112 also varies with changes in temperature of both of the zones $T_1$ and $T_2$. To avoid measurement errors resulting from changes in the temperature $T_2$, the output voltage appearing across resistor 58c is fed to another pair of series-connected resistors 114 and 116, with resistor 114 having a zero temperature coefficient of resistance and resistor 116 having a negative temperature coefficient of resistance. The latter resistor 116 is mounted adjacent the rod 112 in such a manner that the temperature of the resistor is equal to that of the portion of the rod located in the zone $T_2$. Consequently, by properly choosing the material for resistor 116, measurement errors due to thermal expansion or contraction in that portion of the rod are eliminated.

The effects of temperature variations within the zone $T_1$ are avoided in a similar manner. For this purpose, the signal appearing across resistor 116 is fed to two additional series-connected resistors 118 and 120, with resistor 118 having a zero temperature coefficient of resistance and resistor 120 having a negative temperature coefficient of resistance. Resistor 120 is mounted adjacent the portion of rod 112 in the zone $T_2$ in such a manner that the resistor temperature is equal to the temperature of that portion of the rod.

The output voltage appearing across resistor 120 is fed to a meter 60c which is calibrated to indicate the positioning of the element 106 within the opening 110. By properly matching the resistor 120 to the thermal expansion characteristics of the rod 112, measurement errors due to thermal expansion or contraction of the rod portion in zone $T_1$ are eliminated.

Although several preferred embodiments of the invention have been set forth in detail, it is desired to emphasize that these are not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

We claim:

1. Measuring apparatus comprising, in combination, an element formed of material having a predetermined thermal coefficient of expansion and including a surface region the relative dimensional positioning of which is to be determined, said element being immersed in a fluid the temperature of which is subject to substantial variation so as to alter the temperature of said element and thereby vary the positioning of said surface region due to thermal expansion effects, a magnetic core structure mounted apart from said element and arranged to form first and second magnetic circuits having a common core portion through which said magnetic circuits pass, air-gap means in series with both of said magnetic circuits, primary winding means for inducing alternating flux in both of said magnetic circuits, a primary winding electrical circuit connected to said primary winding means and adapted to be coupled to a source of alternating current, a movably-mounted flux-barrier of non-magnetic electrically-conductive material positioned to extend into said air-gap means and arranged to vary the relative division of flux between said first and second magnetic circuits in accordance with the lineal displacement of said flux-barrier from a predetermined position, coupling means for operably connecting said element surface region to said flux-barrier to control the positioning of said flux-barrier with respect to said air-gap means in accordance with the dimensional positioning of said surface region, secondary winding means on said core structure for producing an electrical output signal which changes in magnitude in accordance with variations in the positioning of said flux-barrier with respect to said air-gap means, a first electrical impedance device immersed in said fluid along with said element so that the temperature of said impedance device is equal to the temperature of said element, said first impedance device being formed of material having a temperature coefficient of impedance substantially different from zero, a second impedance device formed of material having a temperature coefficient of impedance substantially different from that of said first impedance device, circuit means including conductive leads extending from said first impedance device back to said secondary winding means, said circuit means being arranged to connect said two impedance devices in series with their remote terminals connected across the output of said secondary windings, and an output circuit for connecting the signal appearing across one of said impedance devices to an indicating device.

2. Apparatus as claimed in claim 1, including a casing having a pair of forked arms adapted to extend around said element for measuring the thickness thereof, said magnetic core structure being mounted within one of said arms.

3. Apparatus as claimed in claim 1, wherein said second impedance device is formed of material having a zero temperature coefficient of impedance, said output circuit being connected across said first impedance device.

4. A measuring system comprising, in combination, a primary measurement subject having a variable condition the magnitude of which is to be determined, means including a movable element coupled to said measurement subject and arranged to produce changes in the positioning of said element in accordance with corresponding variations in said condition, said measurement subject being formed of such material that changes in the temperature thereof result in alterations in the positioning of said element, a magnetic core structure mounted apart from said subject and arranged to form first and second magnetic circuits having a common core portion through which said magnetic circuits pass, primary winding means for inducing alternating flux in both of said magnetic circuits, air-gap means in series with both of said magnetic circuits, a movably mounted flux-barrier of non-magnetic electrically-conductive material positioned to extend into said air-gap means and arranged to vary the relative division of flux between said first and second magnetic circuits in accordance with the displacement of said flux-barrier from a predetermined position, coupling means for operably connecting said element to said flux-barrier to control the positioning of said flux-barrier with respect to said air-gap means in accordance with the positioning of said element, secondary winding means on said core structure for producing an electrical output voltage which changes in accordance with variations in the positioning of said flux-barrier with respect to said air-gap means, first and second output terminals, means coupling said output terminals to said secondary winding means to produce an output signal thereacross, a first electrical impedance device mounted adjacent said measurement subject in such a manner that the temperature of said impedance device is equal to the temperature of said subject, said first impedance device being formed of material having a temperature coefficient of impedance substantially different from zero, a second electrical impedance device formed of material having a temperature coefficient of impedance substantially different from that of said first impedance device, circuit means including conductive leads extending from said first impedance device to said output terminals, said circuit means being arranged to connect said two impedance devices in series and with their remote ends connected respectively to said output terminals, and an output circuit for connecting the signal appearing across one of said impedance devices to an indicating device so as to provide an indication of the magnitude of said condition, the temperature coefficients of impedance of said impedance devices being matched to the temperature characteristics of said measurement subject so that the signal appearing across said one impedance device remains constant when the temperature of said subject changes.

5. A measuring system comprising, in combination, a primary measurement subject having a variable condition the magnitude of which is to be determined, means including a movable element coupled to said measurement subject and arranged to produce changes in the positioning of said element in accordance with corresponding variations in said condition, said measurement subject being formed of such material that changes in the temperature thereof result in alterations in the positioning of said element, a magnetic core structure mounted apart from said subject and arranged to form first and second magnetic circuits having a common core portion through which said magnetic circuits pass, primary winding means for inducing alternating flux in both of said magnetic circuits, air-gap means in series with both of said magnetic circuits, a movably mounted flux-barrier of non-magnetic electrically-conductive material positioned to extend into said air-gap means and arranged to vary the relative division of flux between said first and second magnetic circuits in accordance with the displacement of said flux-barrier from a predetermined position, coupling means for operably connecting said element to said flux-barrier to control the positioning of said flux-barrier with respect to said air-gap means in accordance with the positioning of said element, secondary winding means on said core structure for producing an electrical output voltage which changes in accordance with variations in the positioning of said flux-barrier with respect to said air-gap means, first and second impedance devices having substantially different temperature coefficients of impedance and mounted adjacent said core structure, said impedance devices being connected in series across said secondary winding means, first and second output terminals connected respectively to the ends of one of said impedance devices, the temperature coefficients of said impedance devices being matched to the temperature characteristics of said core structure and said windings so that the voltage across said output terminals remains constant with changes in the temperature of said core and said windings, a third impedance device mounted adjacent said measurement subject in such a manner that the temperature of said third impedance device is equal to the temperature of said subject, said third impedance device being formed of material having a temperature coefficient of impedance substantially different from zero, a fourth impedance device formed of material having a temperature cofficient of impedance substantially different from that of said third impedance device, circuit means including conductive leads extending from said third impedance device to said output terminals, said circuit means being arranged to connect said third and fourth impedance devices in series and with their remote ends connected respectively to said output terminals, and an output circuit for connecting the signal appearing across one of said third and fourth impedance devices to an indicating device so as to provide an indication of the magnitude of said condition, the temperature coefficients of impedance of said third and fourth impedance devices being matched to the temperature characteristics of said measurement subject so that the signal appearing across said one of said third and fourth impedance devices remains constant when the temperature of said subject changes.

6. A measuring system comprising, in combination, a primary measurement subject having a variable condition the magnitude of which is to be determined, means including a movable element coupled to said measurement subject and arranged to produce changes in the positioning of said element in accordance with corresponding variations in said condition, said measurement subject being formed of such material that changes in the temperature thereof result in alterations in the positioning of said element, a magnetic core structure mounted apart from said subject and arranged to form first and second magnetic circuits having a common core portion through which said magnetic circuits pass, primary winding means for inducing alternating flux in both of said magnetic circuits, air-gap means in series with both of said magnetic circuits, a movably mounted flux-barrier of non-magnetic electrically-conductive material positioned to extend into said air-gap means and arranged to vary the relative division of flux between said first and second magnetic circuits in accordance with the displacement of said flux-barrier from a predetermined position, coupling means for operably connecting said element to said flux-barrier to control the positioning of said flux-barrier with respect to said air-gap means in accordance with the positioning of said element, secondary winding means on said core structure for producing an electrical output voltage which changes in accordance with variations in the positioning of said flux-barrier with respect to said air-gap means, first and second output terminals, means coupling said output terminals to said secondary winding means to produce an output signal thereacross, first electrical impedance means mounted adjacent said subject in such a manner that the temperature of said impedance means is equal to the temperature of said subject, said first impedance means being formed of material having a temperature coefficient of impedance substantially different from zero, second electrical impedance means formed of material having a temperature coefficient of impedance substantially different from that of said first impedance means, one of said impedance means comprising a pair of series-connected variable impedance devices having different temperature coefficients of impedance, manually-operable adjustment means for simultaneously changing the electrical impedance of each of said impedance devices while maintaining the total impedance of the series combination constant, circuit means including conductive leads extending from said first impedance means to said output terminals, said circuit means being arranged to connect said two impedance means in series and with their remote ends connected respectively to said output terminals, and an output circuit for connecting the signal appearing across one of said impedance means to an indicating device so as to provide an indication of the magnitude of said condition, the temperature coefficients of impedance of said impedance means being matched by said adjustment means to the temperature characteristics of said measurement subject so that the signal appearing across said last-mentioned one impedance means remains constant when the temperature of said subject changes.

7. A measuring system comprising, in combination, a primary measurement subject having a variable condition the magnitude of which is to be determined, a magnetic core structure mounted apart from said said subject and arranged to form first and second magnetic circuits having a common core portion through which said magnetic circuits pass, primary winding means for inducing alternating flux in both of said magnetic circuits, air-gap means in series with both of said magnetic circuits, a movably mounted flux-barrier of non-magnetic electrically-conductive material positioned to extend into said air-gap means and arranged to vary the relative division of flux between said first and second magnetic circuits in accordance with the displacement of said flux-barrier from a predetermined position, coupling means for operably connecting said measurement subject to said flux-barrier to control the positioning of said flux-barrier with respect to said air-gap means in accordance with said condition, said coupling means extending through two different zones having different temperatures, said coupling means further being formed of such material that changes in the temperature of either of said zones causes a corresponding change in the positioning of said flux-barrier, secondary winding means on said core structure for producing an electrical output voltage which changes in accordance with variations in the positioning of said flux-barrier with respect to said air-gap means, first and second output terminals, means coupling said output terminals to said secondary winding means to produce an output signal thereacross, a first electrical impedance device mounted in said first zone adjacent said coupling means such that the temperature of said impedance device is equal to the temperature of the portion of said coupling means in said first zone, said first impedance device being formed of material having a temperature coefficient of impedance substantially different from zero, a second electrical impedance device formed of material having a temperature coefficient of impedance substantially different from that of said first impedance device, first circuit means including conductive leads extending from said first impedance device to said output terminals, said first circuit means being arranged to connect said first and second impedance devices in series and with their remote ends connected respectively to said output terminals, a third electrical impedance device mounted in said second zone adjacent said coupling means such that the temperature of said third impedance device is equal to the temperature of the portion of said coupling means in said second zone, said third electrical impedance device having a temperature coefficient of impedance substantially different from zero, a fourth electrical impedance device having a temperature coefficient of impedance substantially different from that of said third impedance device, second circuit means arranged to connect said third and fourth impedance devices in series and with their remote ends connected respectively to the terminals of one of said first and second impedance devices, and an output circuit for connecting the signal appearing across one of said third and fourth impedance devices to an indicating device so as to provide an indication of the magnitude of said condition, the temperature coefficients of impedance of said impedance devices being matched to the temperature characteristics of said coupling means so that the signal appearing across said last-named one impedance device remains constant when the temperature of said coupling means changes.

No references cited.